(12) United States Patent
Harai et al.

(10) Patent No.: US 7,616,533 B2
(45) Date of Patent: Nov. 10, 2009

(54) OPTICAL DISC APPARATUS AND ACCESS CONTROL METHOD OF THE SAME

(75) Inventors: Mitsuru Harai, Tokyo (JP); Tsuyoshi Toda, Kodaira (JP); Nobuhiro Takeda, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 544 days.

(21) Appl. No.: 11/490,710

(22) Filed: Jul. 21, 2006

(65) Prior Publication Data

US 2007/0104052 A1    May 10, 2007

(30) Foreign Application Priority Data

Nov. 4, 2005    (JP)    ............................. 2005-320431

(51) Int. Cl.
*G11B 7/00*    (2006.01)
(52) U.S. Cl. ................ 369/44.27; 369/44.29; 369/47.4; 369/53.23
(58) Field of Classification Search ........................ None
See application file for complete search history.

(56) References Cited

U.S. PATENT DOCUMENTS

2002/0167874 A1* 11/2002 Hayashi .................... 369/44.29
2006/0002253 A1* 1/2006 Ishihara .................... 369/44.32

FOREIGN PATENT DOCUMENTS

JP    11-316957    11/1999

* cited by examiner

*Primary Examiner*—Hoa T Nguyen
*Assistant Examiner*—Jesse Hauck
(74) *Attorney, Agent, or Firm*—Townsend and Townsend and Crew LLP (57) ABSTRACT

An optical disc apparatus, as a learning operation before a recording or reproducing operation, rotates an optical disc at a first speed to read PID information, discriminates between lands and grooves of the optical disc, detects switching positions between lands and grooves, sets a rotation angle position of tracking pull-in of an objective lens of a time length that allows the PID information to be stably read, with respect to the switching position, and stores the set position information of tracking pull-in as learning result information. During recording or reproducing, the optical disc apparatus rotates the optical disk at a second speed higher than the first speed, pulls in the objective lens for tracking based on the stored position information of tracking pull-in, reads PID information, and performs the recording or reproducing operation while discriminating between lands and grooves and detecting switching positions between lands and grooves.

16 Claims, 5 Drawing Sheets

OPTICAL DISC APPARATUS AND ACCESS CONTROL METHOD OF THE SAME

CLAIM OF PRIORITY

The present application claims priority from Japanese application serial No. P2005-320431, filed on Nov. 4, 2005, the content of which is hereby incorporated by reference into this application.

BACKGROUND OF THE INTENTION

1. Technical Field of the Invention

The present invention relates to an optical disc apparatus that uses an optical disc having tracks of lands and grooves as an information recording medium, and more particularly to technology for tracking pull-in during a seek or track jump.

2. Description of the Related Art

DVD-RAM, HD-DVD, and the like are currently available as optical discs having tracks of lands and grooves (hereinafter referred to as L/G structural tracks). When a tracking servo is applied to an optical disc of the L/G structural tracks during a recording or reproducing operation, the tracking servo is applied assuming that a light spot of a laser beam is in a groove position, PID information (address information showing physical characteristics of the optical disc) of a header part is read, and then discrimination between a land and a groove is made (hereinafter referred to as L/G discrimination) to determine the position of the light spot and detect a land/groove switching position (hereinafter referred to as an L/G switching position).

A conventional technology related to the present invention is disclosed in Japanese Unexamined Patent Publication No. Hei 11-316957. According to the patent publication, in an optical disc apparatus, to normally perform track-on (tracking pull-in) during a seek or track jump, a header part detecting circuit generates a header part detection signal from a tracking error signal, and outputs it to a tracking control circuit. The tracking control circuit performs track-on control in a data area other than a header area detected by the header part detection signal. Even when a header deviation due to the detection of the header part occurs, the instability of tracking pull-in is reduced to enable track-on.

SUMMARY OF THE INVENTION

Generally, a tracking servo in optical disc apparatuses is applied in a loose portion of a tracking error signal waveform, that is, a long portion of a tracking error signal cycle. However, when an L/G switching position is reached at a stage before PID information is read, that is, at a stage in which L/G discrimination is impossible, the tracking servo would get out of control. When the optical disc apparatuses that can record information in high density are rotating at a high speed, such a drawback occurs frequently, and technology for preventing it is demanded.

The technology described in Japanese Unexamined Patent Publication No. Hei 11-316957 prevents out-of-control tracking servo during a seek or track jump by performing track-on control in a data area other than a header area. In the technology, track-on control (tracking pull-in control) in the header area is probably impossible. The above-described technology is intended to assure track-on in the event of a major deviation such as a defect in the vicinity of a target point during a seek or track jump, not intended to provide for high speed rotation of optical discs that can record information in high density.

A problem of the present invention is to enable an optical disc apparatus of L/G structural tracks to perform tracking pull-in in appropriate rotation angle positions in which PID information can be read without fail regardless of the inside and the outside of a header area during a seek or track jump to enable recording or reproducing under stable tracking control even at high speed rotation, and thereby to solve the problem of the above-described related art.

An object of the present invention is to solve the above-described problem and provide an easy-to-use, highly reliable optical disc apparatus.

The present invention is technology which can solve the above-described problem and achieve the above-described object.

Specifically, according to the present invention, as a learning operation before a recording or reproducing operation, the optical disc apparatus rotates an optical disc at a first speed (speed lower than during recording or reproducing) to read PID information, discriminates between lands and grooves of the optical disc, detects land/groove switching positions, sets an appropriate rotation angle position of tracking pull-in of a time length that allows the PID information to be stably read, with respect to the switching positions, and stores position information of the set appropriate tracking pull-in as learning result information. During recording or reproducing, the optical disc apparatus rotates the optical disc at a predetermined second speed higher than the first speed, pulls in the light spot for tracking, based on the stored position information of tracking pull-in, and performs a recording or reproducing operation while reading PID information, discriminating between lands and grooves, and detecting switching positions between lands and grooves. The rotation angle position of tracking pull-in of an objective lens set in the learning operation is replaced, for example, by count information based on plural frequency signals generated at a substantially equal cycle per rotation of the optical disc.

DETAILED DESCRIPTION OF THE PREFERRED EMBODIMENT

Figure 1:
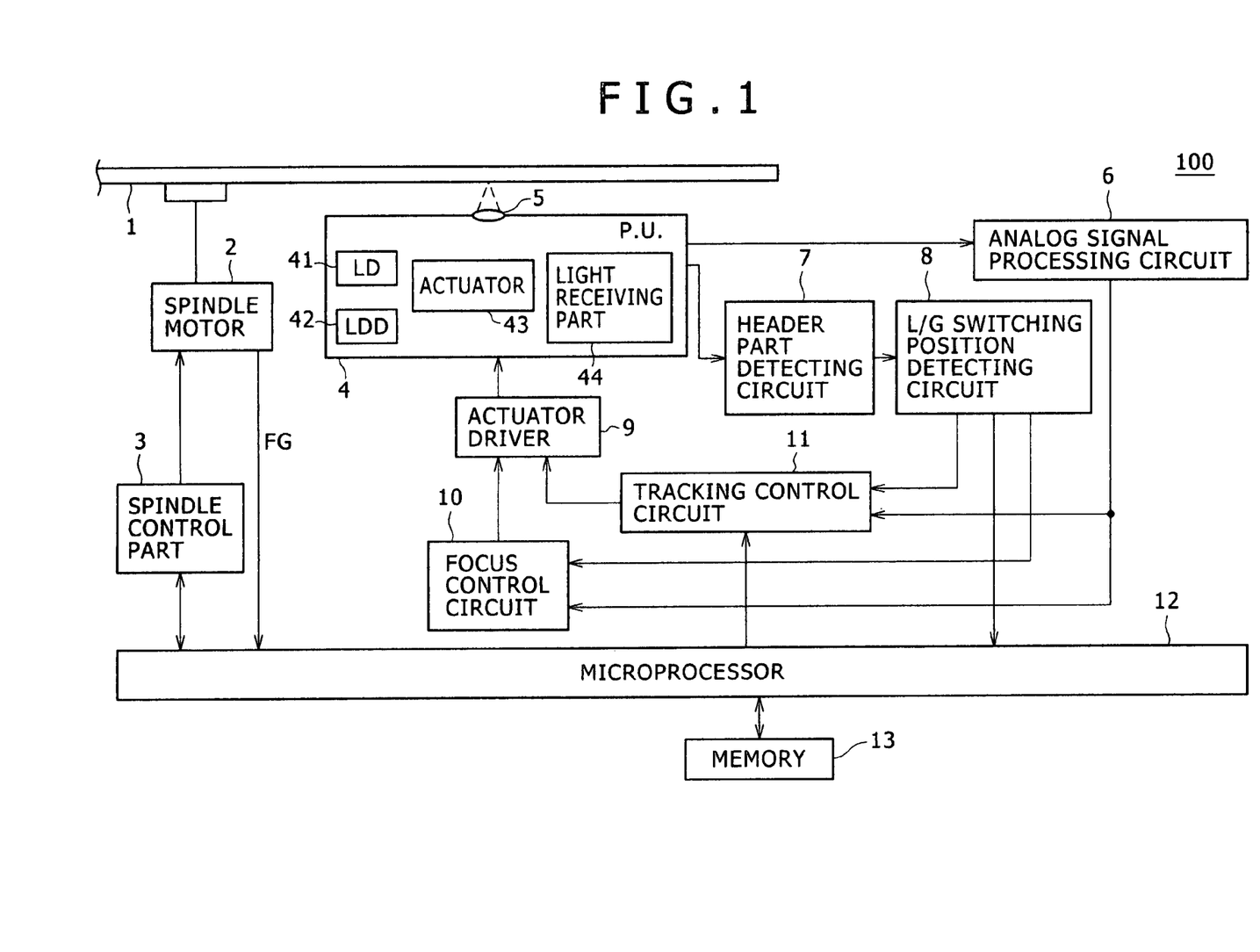
FIG. 1 is a block diagram showing one embodiment of an optical disc apparatus according to the present invention.
Figure 2A:
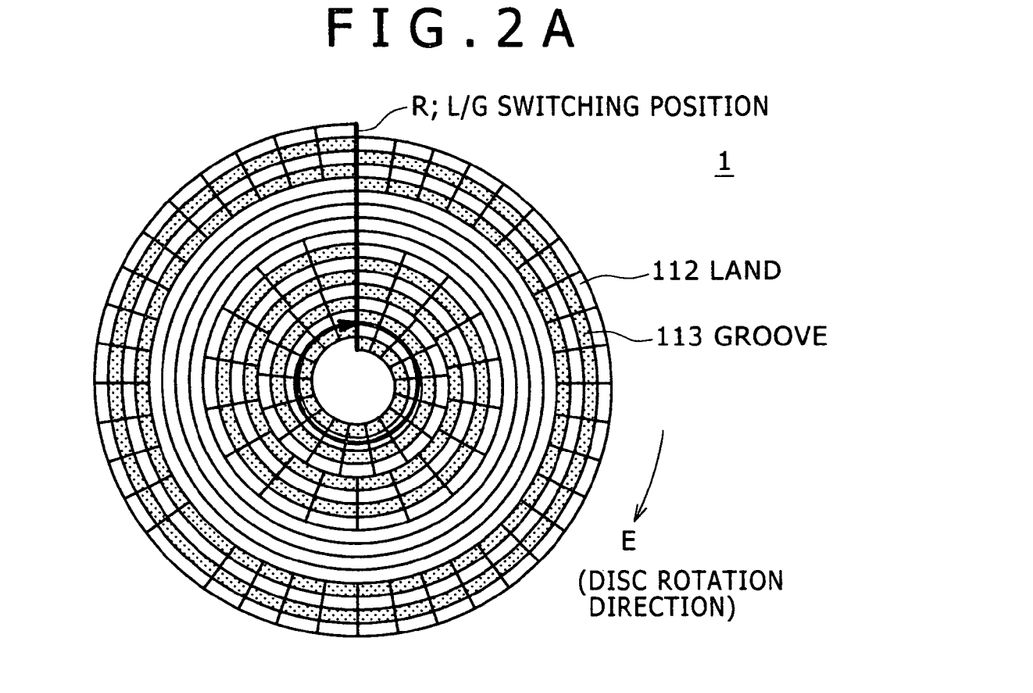
FIGS. 2A and 2B are drawings for explaining an optical disc of L/G structural tracks used as a recording medium in the optical disc apparatus of FIG. 1.
Figure 2B:
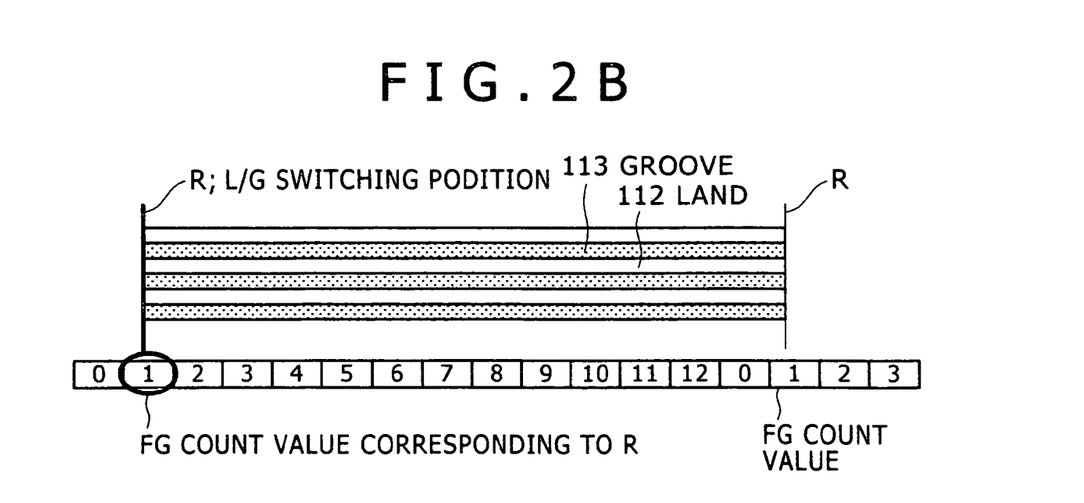
Figure 3A:
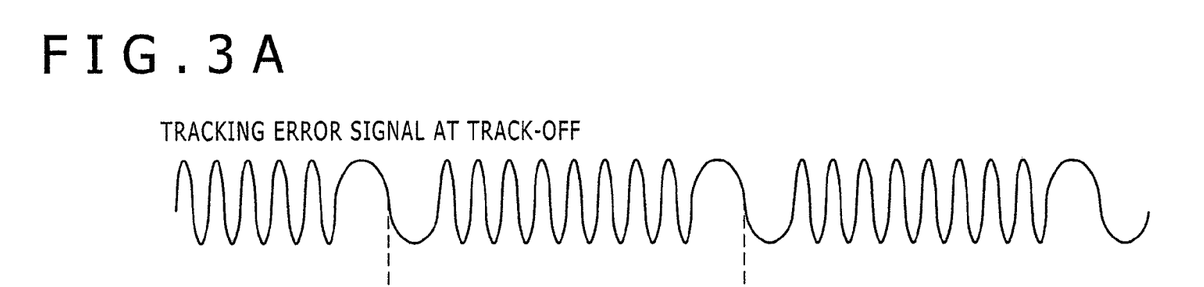
FIGS. 3A, 3B, and 3C are drawings for explaining time length between rotation angle positions of tracking pull-in, and L/G switching positions in the optical disc of FIGS. 2A and 2B.
Figure 3B:
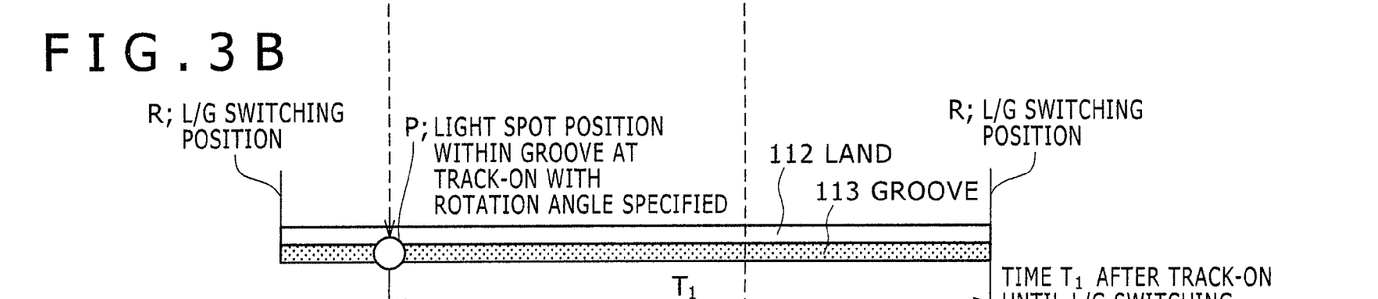
Figure 3C:
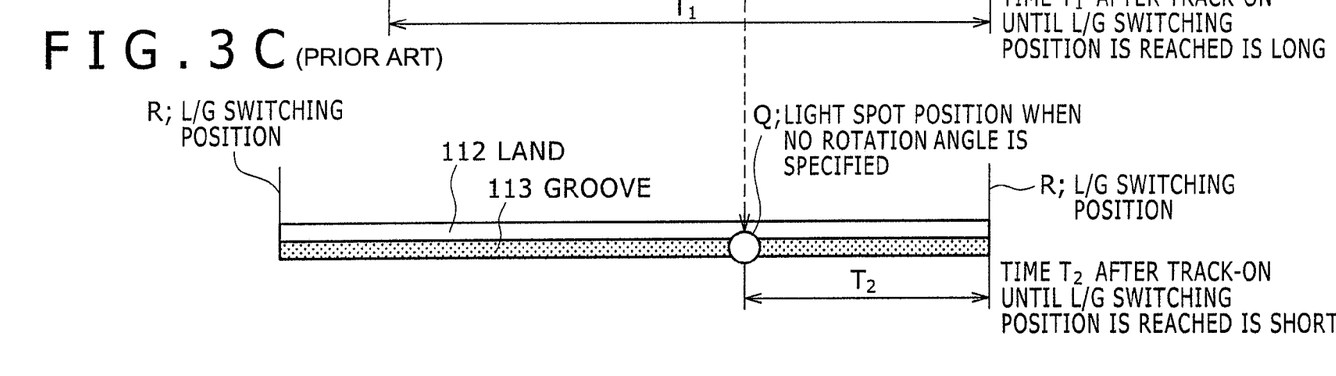
Figure 4:
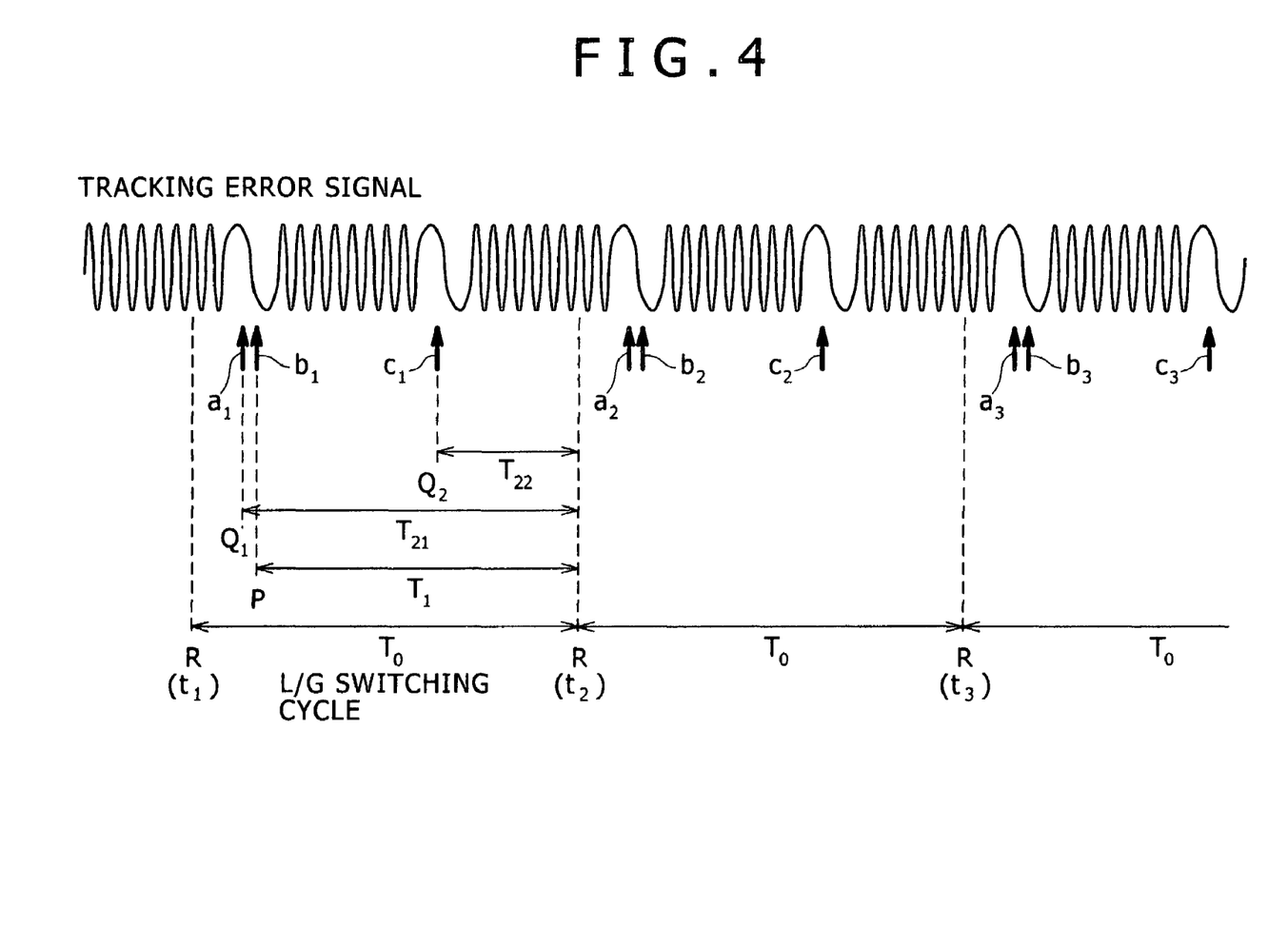
FIG. 4 is a drawing showing comparison of time lengths between rotation angle positions of tracking pull-in in the optical disc 1 of FIGS. 2A and 2B and L/G switching positions between the optical disc apparatus 100 of FIG. 1 and a conventional optical disc apparatus.
Figure 5:
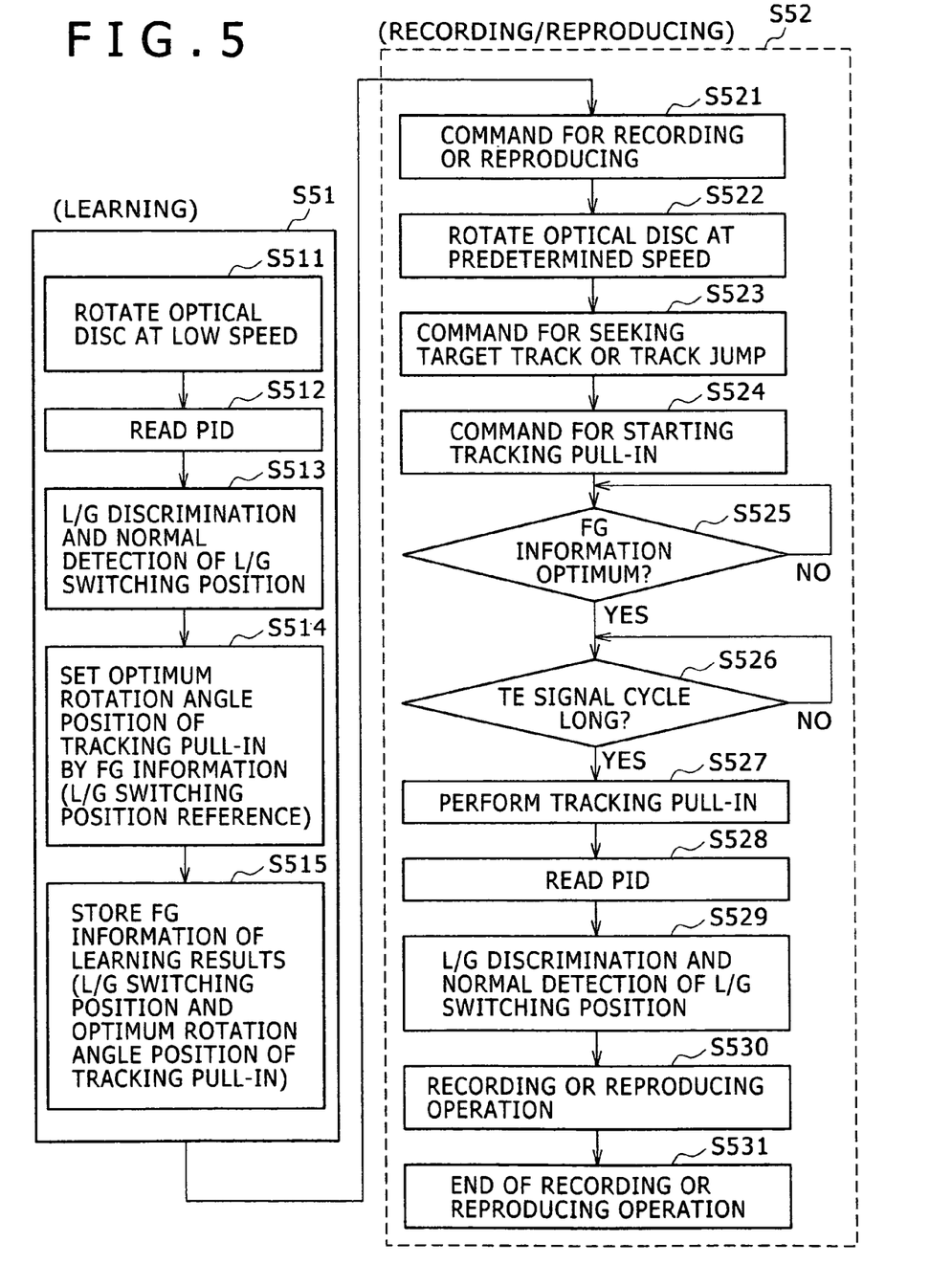
FIG. 5 is a flowchart showing the operation of the optical disc apparatus of FIG. 1.

Hereinafter, an embodiment of the present invention will be described with reference to the accompanying drawings. FIGS. 1 to 5 are drawings for explaining the embodiment. FIG. 1 is a block diagram showing one embodiment of an optical disc apparatus according to the present invention. FIGS. 2A and 2B are drawings for explaining an optical disc of L/G structural tracks used as a recording medium in the optical disc apparatus of FIG. 1. FIGS. 3A, 3B, and 3C are drawings for explaining time length between rotation angle positions of tracking pull-in, and L/G switching positions in the optical disc of FIGS. 2A and 2B. FIG. 4 is a drawing showing comparison of time lengths between rotation angle positions of tracking pull-in in the optical disc 1 of FIGS. 2A and 2B and L/G switching positions between the optical disc apparatus 100 of FIG. 1 and a conventional optical disc apparatus. FIG. 5 is a flowchart showing the operation of the optical disc apparatus of FIG. 1.

In FIG. 1, the reference numeral 100 designates an optical disc apparatus as an embodiment of the present invention. 1 designates an optical disc having L/G structure (track structure of lands and grooves) such as DVD-RAM and HD-DVD. 2 designates a spindle motor that rotationally drives the optical disc 1. 3 designates a spindle control part that controls the rotation of the spindle motor 2. 4 designates an optical pickup. 5 designates an objective lens. 41 designates a laser diode that generates a laser beam within the optical pickup 4. 42 designates a laser driving circuit that drives the laser diode 41 within the optical pickup 4. 43 designates an actuator that changes the position and posture of the objective lens 5 within the optical pickup 4. 44 designates a light receiving part that receives a laser beam reflected from the objective lens 5 within the optical pickup 4. 6 designates an analog signal processing circuit that processes a signal generated from a reflected laser beam in the optical pick-up 4, and forms and outputs a demodulated video signal, a tracking error signal, and a focus error signal. 7 designates a header part detecting circuit as a first detecting circuit that detects PID information of a header part (PID part) of the optical disc 1, according to an output signal from the light receiving unit 44 of the optical pick-up 4. 8 designates an L/G switching position detecting circuit as a second detecting circuit that, according to on an output signal from the light receiving part 44, discriminates between lands and grooves of the optical disc 1 (L/G discrimination) and detects a position (L/G switching position) in which a land changes to a groove, or a groove changes to a land. 9 designates an actuator driver that drives the actuator 43 within the optical pick-up 410. 10 designates a focus control circuit that forms and outputs a focus control signal, based on a focus error signal outputted from the analog signal processing circuit 6. 11 designates a tracking control circuit that forms and outputs a tracking control signal, based on a tracking error signal outputted from the analog signal processing circuit 6. 12 designates a microprocessor as a control means of the whole of the optical disc apparatus 100. 13 designates a memory as a storage means that stores results of processing by the microprocessor 12. The spindle motor 2 is provided concentrically with the optical disc 1, and include a frequency generator (FG) disposed concentrically with its rotation shaft as a frequency signal generating means that generates plural frequency signals (FG signals) at a substantially equal cycle per rotation of the spindle motor 2, that is, one rotation of the optical disc 1.

The microprocessor 12 is supplied with the frequency signal (FG signal) from the FG included in the spindle motor 2, and L/G switching position information of the optical disc 1 detected by the L/G switching position detecting circuit 8. The microprocessor 12 forms a control signal according to the inputted frequency signal, and by the control signal, controls a spindle control part 3 to control the rotation speed of the spindle motor 2 and control the rotation speed of the optical disc 1. The microprocessor 12 converts the inputted frequency signal (FG signal) into an encode pulse, associates the count value (FG count value) with L/G switching position information of the optical disc 1, and sets a rotation angle position of tracking pull-in by an FG count value, with respect to the L/G switching position, that is, based on an FG count value corresponding to the L/G switching position.

In the optical disc apparatus 100 of FIG. 1, the microprocessor 12 as a control means has the optical disc apparatus 100 perform a learning operation before it performs a recording or reproducing operation. The learning operation is performed based on L/G switching position information of the optical disc 1 inputted from the L/G switching position detecting circuit 8, and a frequency signal (FG signal) inputted from the spindle motor 2. During the learning operation, a) the microprocessor 12 brings the optical disc 1 into a first speed rotation state for the learning operation that is slower than a rotation speed at the time of actual recording or reproducing, and b) in the first speed rotation state, the header part detecting circuit 7 reads (detects) PID information of the optical disc 1 according to a signal from the light receiving unit 44 by a reflected laser beam. c) The L/G switching position detecting circuit 8 discriminates between lands and grooves of the optical disc, and detects an L/G switching position, and d) the microprocessor 12 sets a rotation angle position of tracking pull-in of the objective lens 5, with respect to the detected L/G switching position. As the set rotation angle position of tracking pull-in, a position in which a time length which allows the header part detecting circuit 7 to stably read the PID information is obtained is set. Also, the rotation angle position of tracking pull-in is set as count information based on a frequency signal, with respect to the L/G switching position. In the case of this embodiment, as the rotation angle position of the tracking pull-in in which a time length which allows the header part detecting circuit 7 to stably read the PID information is obtained, a position within a half-rotation range of the optical disc 1 from the reference L/G switching position is set. By setting the rotation angle position of the tracking pull-in in that position, the rotation angle position of the tracking pull-in can be made apart from the first L/G switching position after the pull-in by a distance or time corresponding to half rotation or more of the optical disc 1. e) The microprocessor 12 stores the set position information of tracking pull-in in the memory 13 as learning result information.

On the termination of the above-described learning operation of a) to e), the microprocessor 12 commands the optical disc apparatus 100 to perform an actual recording or reproducing operation. In the actual recording or reproducing operation, the microprocessor 12 reads the position information of the tracking pull-in set and stored during the learning operation from the memory 13, and performs tracking pull-in in the set tracking pull-in position. Specifically, during the actual recording or reproducing operation, f) according to a recording or reproducing command, the microprocessor 12 brings the optical disc 1 into a second speed rotation state, which is a predetermined speed faster than the first speed during the above-described learning operation, and g) in the second speed rotation state, the microprocessor 12 controls the tracking control circuit, and based on the position information of tracking pull-in stored as the learning result information, performs tracking pull-in of the objective lens 5 in that position. h) Then, the header part detecting circuit 7 reads PID information of the optical disc 1, according to an output signal from the light receiving unit 44. i) Next, the L/G switching position detecting circuit 8 performs a recording or reproducing operation while performing L/G discrimination of the optical disc 1 and detecting an L/G switching position.

Components of the optical disc apparatus of FIG. 1 used in descriptions below are identified by the same reference numerals of those in FIG. 1.

FIGS. 2A and 2B are drawings for explaining the optical disc 1 of L/G structure used as recording media of the optical disc apparatus 100 of FIG. 1, wherein FIG. 2A is a model drawing of a recording surface of the optical disc 1, and FIG. 2B is a drawing showing a linear expansion of a part of the recording surface of FIG. 2A. FIG. 2B is shown together with count values (hereinafter referred to as FG count values) of a frequency signal of the FG.

In FIG. 2, 112 designates a land; 113 designates a groove; R designates an L/G switching position; and E designates a rotation direction of the optical disc 1. A light spot of a laser beam irradiated to a recording surface of the optical disc 1 from the objective lens 5 switches from a land 112 to a groove 113 or the groove 113 to the land 112 in an L/G switching position R as the optical disc 1 rotates in the E direction. The switching position R is detected by the L/G switching position detecting circuit 8. In the example of FIG. 2, the FG count values 0 to 12 correspond to one rotation of the optical disc 1, and an FG count value corresponding to the L/G switching position R is defined as "1." That is, when an FG count value is 1, L/G switching is performed.

FIGS. 3A, 3B, and 3C are drawings for explaining time lengths between rotation angle positions of tracking pull-in in the optical disc 1 of FIGS. 2A and 2B and L/G switching positions R, wherein FIG. 3A shows a waveform diagram of a tracking error signal when tracking control is off, FIG. 3B is a drawing showing a time length between a rotation angle position and an L/G switching position R during tracking pull-in when a light spot of an irradiated laser beam is pulled in for tracking in the specified rotation angle position on a groove 113, and FIG. 3C is a drawing showing a time length between a rotation angle position and an L/G switching position R during tracking pull-in when the light spot is pulled in for tracking in the rotation angle position on a groove 113 not specified by the microprocessor 12. FIG. 3B corresponds to a case of the optical disc apparatus 100 of FIG. 1, and FIG. 3C corresponds to a case of conventional optical disc apparatuses.

In FIG. 3B, P designates a rotation angle position of a light spot and a specified rotation angle position of tracking pull-in when the cycle of a tracking error signal is in a long state, and $T_1$ designates a time length between the rotation angle position P and a subsequent first L/G switching position R. In FIG. 3C, Q designates a rotation angle position of a light spot and an unspecified rotation angle position of tracking pull-in when the cycle of a tracking error signal is in a long state, and $T_2$ designates a time length between the rotation angle position Q and a subsequent first L/G switching position R. In FIG. 3B, the rotation angle position P of tracking pull-in is specified (set) in a position within a half-rotation range of the optical disc 1 from the L/G switching position R. On the other hand, in FIG. 3C, a rotation angle position Q of tracking pull-in is a position beyond a half-rotation range of the optical disc 1 from the L/G switching position R. A tracking error signal when tracking control is off, as shown in FIG. 3A, is a signal having a cycle of a time interval when a light spot crosses L/G structural tracks of the optical disc 1, and has a waveform having long portions of the cycle at two locations per rotation due to eccentricity of the optical disc 1, that is, portions in which the light spot crosses the tracks slowly. In any of the case of FIG. 3B and FIG. 3C, tracking pull-in is performed without fail in rotation angle positions in a range in which the cycle of the tracking error signal becomes long. In FIG. 3B, time length $T_1$ after tracking pull-in is performed in the rotation angle position P until L/G switching is performed is long. Consequently, for example, in the optical disc apparatus 100, within this time, the header part detecting circuit 7 can read (detect) PID information and the L/G switching position detecting circuit 8 can make L/G discrimination and detect L/G switching positions without fail, with the result that stable tracking control can be performed with off-tracking curbed. On the other hand, in FIG. 3C, a time length $T_1$ after tracking pull-in is performed in the rotation angle position Q until L/G switching is performed is short. Consequently, it becomes difficult to read (detect) PID information, collaterally it becomes difficult to make L/G discrimination and detect L/G switching positions, and off-tracking is liable to occur because of unstable tracking control.

FIG. 4 is a drawing showing a comparison of time lengths between rotation angle positions of tracking pull-in in the optical disc 1 of FIGS. 2A and 2B and L/G switching positions between the optical disc apparatus 100 of FIG. 1 and a conventional optical disc apparatus.

In the optical disc apparatus 100 of FIG. 1, one rotation angle position of tracking pull-in of a light spot exists per rotation of the optical disc 1. It is in a position in which a predetermined time elapses, with respect to an L/G switching position R, and is specified (set) in a position in which the cycle of a tracking error signal is in a long state. On the other hand, in the conventional optical disc apparatus, since tracking pull-in of a light spot is performed in a rotation angle position in which the cycle of a tracking error signal is long when tracking control is off, two rotation angle positions exist for tracking pull-in per rotation, and a tracking pull-in operation is performed in one of them.

In FIG. 4, $t_1$, $t_2$, and $t_3$ designate times when L/G switching is performed in L/G switching positions R, respectively. P designates a specified rotation angle position of tracking pull-in between times t1 and t2 in the optical disc apparatus 100 of FIG. 1. Q1 and Q2 designate unspecified rotation angle positions of tracking pull-in between times $t_1$, and $t_2$ in a conventional optical disc apparatus. $T_0$ designates the cycle of L/G switching. $T_1$ designates time length required when a light spot moves from the rotation angle position P of tracking pull-in to the L/G switching position R (time $t_2$) in the optical disc apparatus 100 of FIG. 1. $T_{21}$ designates time length required when a light spot moves from the rotation angle position $Q_1$ of tracking pull-in to the L/G switching position R (time $t_2$) in the conventional optical disc apparatus. $T_{22}$ designates time length required when a light spot moves from the rotation angle position $Q_2$ of tracking pull-in to the L/G switching position R (time $t_2$) in the conventional optical disc apparatus. $a_1$, $b_1$, and $c_1$ respectively designate arrows indicating the positions of the rotation angle positions $Q_1$, P, and $Q_2$ on the tracking error signal waveform between times $t_1$ an $t_2$. $a_2$, $b_2$, and $c_2$ respectively designate arrows indicating the positions of the rotation angle positions $Q_1$, P, and $Q_2$ on the tracking error signal waveform between times $t_2$ an $t_3$. $a_3$, $b_3$, and $c_3$ designate arrows respectively indicating the positions of the rotation angle positions $Q_1$, P, and $Q_2$ of tracking pull-in on the tracking error signal waveform within an L/G switching cycle with $t_3$ as a start point.

As shown in FIG. 4, in the optical disc apparatus 100 of FIG. 1, since a long time $T_1$ is obtained until L/G switching is performed after tracking pull-in in the position P, as described above, within the time $T_1$, PID information can be read (detected) and L/G discrimination and the detection of an L/G switching position are performed, with the result that stable tracking control can be performed with off-tracking curbed. In contrast to this, in the conventional optical disc apparatus, when a light spot is pulled in for tracking in the position $Q_1$, since a long time $T_{21}$ is obtained as in the optical disc apparatus 100 until L/G switching is performed, PID information reading (detecting), L/G information discrimination, and the detection of an L/G switching position can be performed within the time $T_{21}$, so that stable tracking control can be performed. On the other hand, when a light spot is pulled in for tracking in the position $Q_2$, since time $T_{22}$ until L/G switching is performed is short, PID information reading (detecting) becomes difficult, and L/G discrimination and the detection of an L/G switching position become impossible, so that stable tracking control cannot be performed. In the conventional optical disc apparatus, a light spot is pulled in for tracking in the position $Q_2$ with a probability of 50%. In the optical disc apparatus 100 of this embodiment, the above-described position P is set in learning operation performed before an actual recording or reproducing operation, and information about the position is stored in the memory 13. In an actual recording or reproducing operation performed after that, the stored position P is read from the memory 13, and based on it, tracking pull-in is always performed in the position P.

FIG. 5 is a flowchart of recording or reproducing of the optical disc apparatus 100 of FIG. 1.

In FIG. 5,

As the learning operation performed before a recording or reproducing operation, (1) The microprocessor 12 controls the rotation of the spindle motor 2 via the spindle control part 3 to rotate the optical disc 1 at a predetermined low speed (first speed) (Step S511).

(2) When the optical disc 1 is rotating at the low speed, the header part detecting circuit 7 reads (detects) PID information (Step S512).

(3) The L/G switching position detecting circuit 8 makes L/G discrimination of the optical disc 1 and detects an L/G switching position (Step S513).

(4) The microprocessor 12 sets a rotation angle position of tracking pull-in of a light spot by the objective lens 5, with respect to the L/G switching position detected in Step S513 (Step S514). The set rotation angle position of tracking pull-in is a position in which a time length which allows the header part detecting circuit 7 to stably read PID information is obtained, and a position in which a track crossing cycle in a tracking error signal is long. For example, the set rotation angle position of tracking pull-in is a position within a half-rotation range of the optical disc 1 from the reference L/G switching position R. The microprocessor 12 sets the set rotation angle position of tracking pull-in as position information on a frequency signal of the FG, with respect to the L/G switching position. That is, the microprocessor 12 converts the inputted frequency signal (FG signal) into an encode pulse, associates the count value (FG count value) with L/G switching position information of the optical disc 1, and sets a rotation angle position of tracking pull-in by an FG count value, with respect to the L/G switching position, that is, an FG count value corresponding to the L/G switching position.

(5) The microprocessor 12 stores the FG count value of the L/G switching position detected in Step S513, and the FG count value of the rotation angle position of tracking pull-in set in S514 in the memory 13 as learning result information (Step S515).

After the learning operation consisting of the steps S511 to S515 (Step S51), the microprocessor 12 commands the optical disc apparatus 100 to perform an actual recording or reproducing operation, based on the learning result information (Step S52). In the recording or reproducing operation, seek or track jump is performed. That is, (6) A command for recording or reproducing is issued (Step S521).

(7) The microprocessor 12 controls the rotation of the spindle motor 2 via the spindle control part 3 to rotate the optical disc 1 at a second speed, which is a predetermined speed higher than the first speed during the above-described learning operation (Step S522).

(8) The microprocessor 12 issues the command to seek a target track or perform a track jump (Step S523).

(9) The microprocessor 12 commands the tracking control circuit 11 to start tracking pull-in of a light spot. (Step S524).

(10) The microprocessor 12 determines whether FG information (FG count value) is within an optimum range when the optical disc 1 is in a current second speed rotation state (Step S525).

(11) When the determination result in Step S525 proves that FG information is within an optimum range, the microprocessor 12 determines whether a current light spot position is in a position in which a track crossing cycle of the tracking error signal is long (Step S526). When the determination result in Step S525 proves that FG information is not within an optimum range, the microprocessor 12 waits until an optimum range is obtained.

(12) When the determination result in Step S526 proves that a current light spot position is in a position in which a track crossing cycle of the tracking error signal is long, the microprocessor 12 commands the tracking control circuit 11 to pull in a light spot for tracking in the rotation angle position of tracking pull-in set in the learning operation in Step S514 (Step S527). On receiving the command, the tracking control circuit 11 controls the actuator driver 9 to displace the objective lens via the actuator 43 and control a light spot position of an irradiated laser. When the determination result in Step S526 proves that the current light spot position is not in a position in which a track crossing cycle of the tracking error signal is long, the microprocessor 12 waits until a position in which a track crossing cycle is long is reached.

(13) After the tracking pull-in, the header part detecting circuit 7 reads PID information of the optical disc 1 according to an output signal from the light receiving part 44 (Step S528).

(14) The L/G switching position detecting circuit 8 makes L/G discrimination of the optical disc 1 and detects an L/G switching position (Step S529).

(15) When the L/G switching position is detected, the optical disc apparatus 100 performs information recording or reproducing for the optical disc 1 (Step S530).

(16) After that, the optical disc apparatus 100 terminates the recording or reproducing operation (Step S531).

The microprocessor 12 executes one or both of a series of processes of the above-described steps S511 to S515 as the learning operation and a series of processes of the above-described steps S521 to S531 as the recording or reproducing operation according to a program stored in the memory 13 or the like within the optical disc apparatus 100 so that the above-described learning operation of (1) to (5), the recording or reproducing operation of (6) to (16), or a series of operations consisting of a combination of the learning operation and the recording or reproducing operation of (1) to (16) are automatically performed.

According to the embodiment of the present invention, in the optical disc apparatus 100, during a seek or a track jump, since a long gap of time can be taken between a tracking pull-in time and an L/G switching time, PID information can be read within the time gap. Accordingly, the detection of an L/G switching position R is assured, and a recording or reproducing operation can be performed under tracking control free from out-of-track. As a result, an easy-to-use, highly reliable optical disc apparatus can be provided.

In the above-described embodiment, the frequency signal generating means is provided in the spindle motor 2. However, the frequency signal generating means is not limited to this.

The present invention may also be implemented in embodiments other than the above-described embodiment without departing from the scope or the major characteristics of the present invention. Therefore, it is to be understood that the above-described embodiment is only one embodiment of the present invention in all aspects and should not be limitedly interpreted. The scope of the present invention is shown by the claims. Furthermore, variations and modifications that belong to equivalents to the claims are all within the scope of the present invention.

What is claimed is:

1. An optical disc apparatus that records or reproduces information by irradiating a laser beam to an optical disc having a track structure of lands and grooves from a pickup, comprising:
   a first detecting circuit that detects PID information of the optical disc according to a signal by a laser beam reflected from the optical disc;
   a second detecting circuit that discriminates between lands and grooves of the optical disc, and detects a switching position from a land to a groove or from a groove to a land;
   a controller for setting a rotation angle position of tracking pull-in of an objective lens in which the first detecting circuit can detect the PID information, with respect to the land/groove switching position; and
   a memory for storing the set position information of tracking pull-in,
   wherein, after the position information of tracking pull-in is stored, the optical disc is rotated at a predetermined second speed faster than a first speed, and tracking pull-in is performed based on the stored position information of tracking pull-in to record or reproduce information.

2. The optical disc apparatus according to claim 1, including a frequency generator for generating a plurality of frequency signals at a substantially equal cycle per rotation of the optical disc,
   wherein the controller sets the rotation angle position of tracking pull-in of the objective lens as count information based on the frequency signals, with respect to the land/groove switching position.

3. The optical disc apparatus according to claim 2,
   wherein the controller sets the rotation angle position of tracking pull-in of the objective lens to a position in which a cycle of a tracking error signal is long.

4. The optical disc apparatus according to claim 2,
   wherein the controller sets the rotation angle position of tracking pull-in of the objective lens to a position within a half-rotation range of the optical disc from the land/groove switching position.

5. The optical disc apparatus according to claim 2,
   wherein the controller sets the rotation angle position of tracking pull-in of the objective lens to a position within a half-rotation range of the optical disc from the land/groove switching position, and a position in which the cycle of a tracking error signal is long.

6. The optical disc apparatus according to claim 1,
   wherein the controller sets the rotation angle position of tracking pull-in of the objective lens to a position in which a cycle of a tracking error signal is long.

7. The optical disc apparatus according to claim 1,
   wherein the controller sets the rotation angle position of tracking pull-in of the objective lens to a position within a half-rotation range of the optical disc from the land/groove switching position.

8. The optical disc apparatus according to claim 1,
   wherein the controller sets the rotation angle position of tracking pull-in of the objective lens to a position within a half-rotation range of the optical disc from the land/groove switching position, and a position in which the cycle of a tracking error signal is long.

9. An access control method of an optical disc apparatus that records or reproduces information by irradiating a laser beam via an objective lens to an optical disk having a track structure of lands and grooves, the method comprising the steps of:
   a first step of bringing an optical disk into a first speed for a learning operation before a recording or reproducing operation;
   a second step of reading PID information of the optical disk according to a signal by a reflected laser beam;
   a third step of discriminating between lands and grooves of the optical disc, and detecting a switching position from a land to a groove or from a groove to a land;
   a fourth step of setting a rotation angle position of tracking pull-in of the objective lens in which the PID information can be read, with respect to the switching position;
   a fifth step of storing the set position information of tracking pull-in as learning result information;
   a sixth step of bringing the optical disk into a second speed for a recording or reproducing operation that is faster than the first speed, according to a recording or reproducing command;
   a seventh step of performing tracking pull-in of the objective lens, based on the position information of tracking pull-in stored as the learning result information;
   an eighth step of reading the PID information of the optical disc; and
   a ninth step of performing a recording or reproducing operation while discriminating between lands and grooves of the optical disc and detecting a switching position from a land to a groove or from a groove to a land.

10. The access control method of the optical disc apparatus according to claim 9,
    wherein the fourth step sets the rotation angle position of tracking pull-in of the objective lens is replaced by count information based on a plurality of frequency signals generated at a substantially equal cycle per rotation of the optical disc, with respect to the switching position.

11. The access control method of the optical disc apparatus according to claim 10,
    wherein the fourth step sets the rotation angle position of tracking pull-in of the objective lens to a position in which a cycle of a tracking error signal is long.

12. The access control method of the optical disc apparatus according to claim 10,
    wherein the fourth step sets the rotation angle position of tracking pull-in of the objective lens to a position within a half-rotation range of the optical disc from the land/groove switching position.

13. The access control method of the optical disc apparatus according to claim 10,
    wherein the fourth step sets the rotation angle position of tracking pull-in of the objective lens to a position within a half-rotation range of the optical disc from the land/ groove switching position, and in which the cycle of a tracking error signal is long.

14. The access control method of the optical disc apparatus according to claim 9, wherein the fourth step sets the rotation angle position of tracking pull-in of the objective lens to a position in which a cycle of a tracking error signal is long.

15. The access control method of the optical disc apparatus according to claim 9, wherein the fourth step sets the rotation angle position of tracking pull-in of the objective lens to a position within a half-rotation range of the optical disc from the land/groove switching position.

16. The access control method of the optical disc apparatus according to claim 9, wherein the fourth step sets the rotation angle position of tracking pull-in of the objective lens to a position within a half-rotation range of the optical disc from the land/groove switching position, and in which the cycle of a tracking error signal is long.

* * * * *